United States Patent
Hatano et al.

(10) Patent No.: US 7,600,738 B2
(45) Date of Patent: Oct. 13, 2009

(54) OUTPUT SHAFT COUPLING STRUCTURE OF ELECTRICALLY OPERATED CONTROL VALVE

(75) Inventors: Kenta Hatano, Tokyo (JP); Sotsuo Miyoshi, Tokyo (JP); Youichi Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 560 days.

(21) Appl. No.: 11/057,134

(22) Filed: Feb. 15, 2005

(65) Prior Publication Data

US 2005/0199847 A1    Sep. 15, 2005

(30) Foreign Application Priority Data

Mar. 15, 2004    (JP) .............................. 2004-072901

(51) Int. Cl.
*F16K 31/02* (2006.01)
(52) U.S. Cl. .................... 251/129.19; 251/129.15; 251/129.2; 123/90.11
(58) Field of Classification Search ............ 251/129.15, 251/129.16, 129.2, 129.01, 129.18, 129.19, 251/279, 318, 319, 356; 123/90.11
See application file for complete search history.

(56) References Cited

U.S. PATENT DOCUMENTS

| | | | | |
|---|---|---|---|---|
| 2,609,989 A | * | 9/1952 | Burklin | 236/9 R |
| 4,953,756 A | * | 9/1990 | Breault et al. | 222/309 |
| 5,769,390 A | * | 6/1998 | Ando | 251/129.11 |
| 6,089,536 A | * | 7/2000 | Watanabe et al. | 251/129.11 |
| 6,217,001 B1 | * | 4/2001 | Gluchowski et al. | 251/129.07 |
| 6,394,415 B1 | * | 5/2002 | Ohmi et al. | 251/129.16 |
| 6,698,408 B2 | * | 3/2004 | McConnell | 123/568.21 |
| 6,854,920 B2 | * | 2/2005 | Romero | 403/329 |
| 2005/0229969 A1 | * | 10/2005 | Nguyen et al. | 137/240 |

FOREIGN PATENT DOCUMENTS

| | | |
|---|---|---|
| DE | 19624901 A1 | 1/1997 |
| DE | 19730998 A1 | 1/1998 |
| EP | 1 372 244 A1 | 12/2003 |
| JP | 1-203646 A | 8/1989 |
| JP | 6-081966 A | 3/1994 |
| JP | 8-145221 A | 6/1996 |
| JP | 8-151963 A | 6/1996 |
| JP | 9-32654 A | 2/1997 |
| JP | 3204043 B2 | 6/2001 |

* cited by examiner

*Primary Examiner*—J. Casimer Jacyna
(74) *Attorney, Agent, or Firm*—Birch, Stewart, Kolasch & Birch, LLP

(57) ABSTRACT

Output shaft coupling structure of electrically operated control valve including: valve rod which is provided with valve for opening and closing fluid passage and is mounted to valve housing in such a way as to move along axial direction; and electrically controlled motor for driving the valve rod along the axial direction, the coupling structure couples motor shaft of the electrically controlled motor to the valve rod, and the plate shaped like a flat plate is fixed at its center to end portion, to which the valve rod is coupled, of the motor shaft and the plate is bent to form hooking and engaging portion at its both ends after the plate is fixed, thereby the plate hooks and engages with the valve rod.

11 Claims, 4 Drawing Sheets

200
OUTPUT SHAFT COUPLING STRUCTURE OF ELECTRICALLY OPERATED CONTROL VALVE

BACKGROUND OF THE INVENTION

1. Field of the Invention

The present invention relates to output shaft coupling structure of an electrically operated control valve which is applied to an EGR valve unit for opening and closing exhaust gas recirculation passage of an engine.

2. Description of the Related Art

Various kinds of structures have been proposed in the related art, as output shaft coupling structures of electrically operated control valves in which a valve rod of the EGR valve unit is coupled to a motor shaft of electrically controlled motor for driving this valve rod in an axial direction by a coupling part, and in any one of them, the valve rod is coupled to the motor shaft by use of the coupling part which is formed previously in a predetermined shape. One of these coupling structures is proposed as a structure in which the coupling part is made previously to have a box shape in cross section, and the coupling part is fixed to a top end of the valve rod, then, the coupling part is fastened by nuts to a bottom end of the motor shaft from inside the coupling part via a washer (see, for example, patent document 1).

Further, as another output shaft coupling structure of the electrically operated control valve in the related art, is also proposed a structure in which the coupling part (engaging plate) is made previously to have a letter U shape in cross section, and the coupling part is fixed by caulking to an end portion, to which the valve rod is coupled, of the motor shaft and a retainer plate which becomes a swivel plate of a spring for urging the valve rod in a direction that closes the valve, is fixed by caulking in the same way to an end portion, to which the motor shaft is coupled, of the valve rod, then, a hooking portion which is formed in an open end portion of the coupling part, is inserted into and engaged with a slit which is formed in the retainer plate (see, for example, patent document 2 and patent document 3).

[Patent document 1] Japanese Patent No. 3204043 (pages 3-4, FIG. 1)

[Patent document 2] Japanese Unexamined Patent Publication No. 8-151963 (pages 3-4, FIG. 1)

[Patent document 3] Japanese Unexamined Patent Publication No. 9-32654 (page 3, FIG. 4)

Since the output shaft coupling structures of electrically operated control valves in the related art are constructed in the above described manners, the coupling part which is made previously to have a box shape or letter U shape in cross section, needs to be fitted to the end portion of the valve rod or the motor shaft, to which the motor shaft or the valve rod is coupled, in limited space by fixing means such as fastening nut or caulking, so that the output shaft coupling structure in the related art presents a problem that this kind of fitting work impairs workability very much, for example, takes much time. In other words, the coupling part which is used to couple the motor shaft and the valve rod of EGR valve unit together, is generally small in size and hence an inside of the coupling part that is made previously in a shape of the hollow cross section described above, becomes extremely narrow space and the fitting work, for example, by fastening nut or caulking as described above, needs to be performed in this narrow space, which results in presenting the above described problem. Furthermore, the small sized coupling part which is shaped into the cross section described above, presents a problem that the coupling part involves difficulty when it is shaped, and hence impairs also productivity.

SUMMARY OF THE INVENTION

The present invention has been made to solve the above described problems. An object of the invention is to provide an output shaft coupling structure of electrically operated control valve that couples a valve rod to a motor shaft by a coupling part but can fit the coupling part to the motor shaft quickly with ease and hence can shorten time required to fit the coupling part to the motor shaft, and can also improve productivity of the coupling part.

An output shaft coupling structure of an electrically controlled valve in accordance with the present invention is an output shaft coupling structure of electrically operated control valve including: valve rod which is provided with valve for opening and closing fluid passage and is mounted to valve housing in such a way as to move along axial direction; and electrically controlled motor for driving the valve rod along the axial direction, the coupling structure couples motor shaft of the electrically controlled motor to the valve rod, and the plate shaped like a flat plate is fixed at its center to end portion, to which the valve rod is coupled, of the motor shaft and the plate is bent to form hooking and engaging portion at its both ends after the plate is fixed, thereby the plate hooks and engages with the valve rod.

According to the present invention, the plate shaped like a flat plate is fixed at its center to the end portion, to which the motor shaft is coupled, of the valve rod and is bent at its both ends after the plate being fixed to the portion, thereby the plate hooks and engages with the valve rod, so that work space when the plate is fitted to the motor shaft by caulking or the like, is not limited by the plate shaped like flat plate. Therefore, the present invention produces an effect of shortening time required to fit the plate to the motor shaft greatly as compared with a coupling part having hollow cross section in the related art and hence the structure improves workability in fitting. Further, the plate shaped like a flat plate can be easily formed, thereby the present invention produces an effect of improving productivity and reducing cost. Still further, the plate fixed to the motor shaft can be easily bent at its both ends in a direction in which the plate is engaged with the valve rod, so the present invention produces an effect of coupling the motor shaft to the valve rod with ease by bending the plate at its both ends.

BRIEF DESCRIPTION OF THE DRAWINGS

FIG. 2(*d*) is a bottom view of the plate in FIG. 2(*a*). FIG. 2(*e*) is a bottom view of the plate in FIG. 2(*b*). FIG. 2(*f*) is a bottom view of the plate in FIG. 2(*c*).

FIG. 3(A) is viewed from right side.

DETAILED DESCRIPTION OF THE PREFERRED EMBODIMENTS

Embodiment 1

Figure 1:
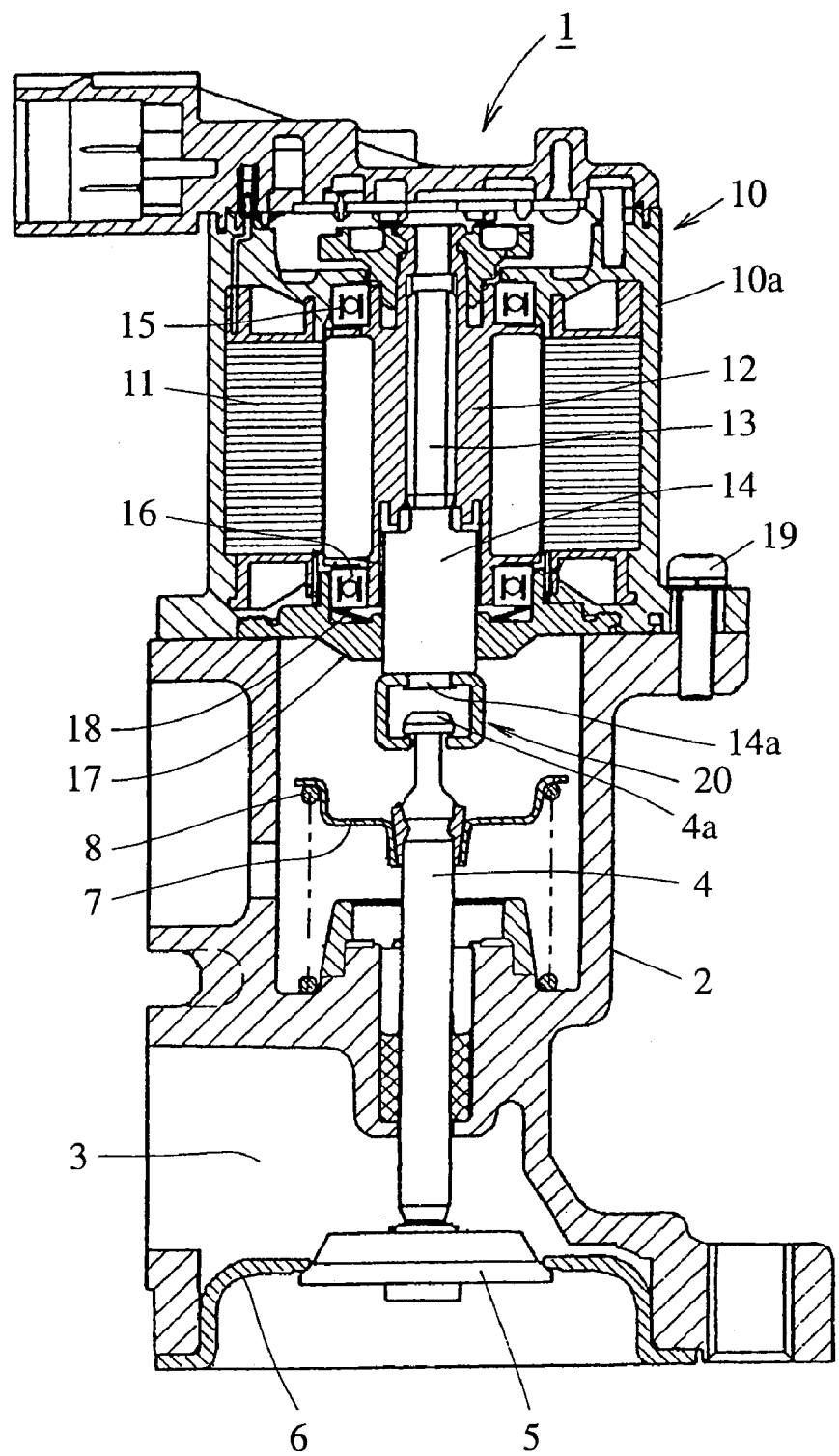
FIG. 1 is a sectional view to show an EGR valve unit provided with the output shaft coupling structure of an electrically operated control valve in accordance with Embodiment 1 of the present invention.
Figure 2:
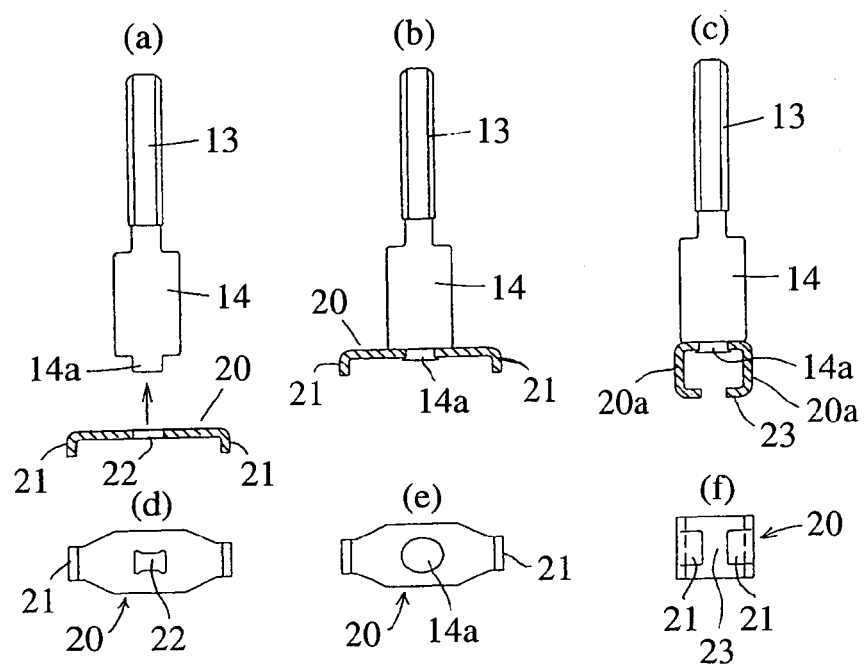
FIGS. 2(*a*) to 2(*c*) are sectional views to show the shape of a plate for coupling shafts in FIG. 1 and a process for fitting the plate in connection with a motor shaft.

FIG. 1 is a sectional view to show an EGR valve unit provided with the output shaft coupling structure of an electrically operated control valve in accordance with Embodiment 1 of the present invention. FIG. 2 show the shape of a plate for coupling shafts and a process for fitting the plate in FIG. 1.

The EGR valve unit 1 shown in FIG. 1 is provided with a valve housing 2 in which a fluid passage (exhaust gas recirculation passage) for recirculating exhaust gas from an engine is formed. A valve rod 4 is mounted in this valve housing 2 in such a way as to move along an axial direction. The valve rod 4 has a valve 5 that can be put into contact with or be separated from a valve seat 6 fitted in the valve housing 2. The valve rod 4 is urged upward (in a direction in which the valve is closed) by a spring 8 which is interposed between a spring holder 7 fitted integrally on the valve rod 4 and a bottom wall of outside depressed portion of the valve housing 2. Further, the valve rod 4 has a head portion 4a which is integrally formed thereon.

An electrically controlled motor 10 for driving the valve rod 4 along the axial direction, is mounted outside the valve housing 2. This electrically controlled motor 10 is so constructed as to include a coil 11, a rotor 12 which is arranged inside the coil 11, and a motor shaft 14 which has on its one end a screw rod portion 13 that is screwed into a center aperture made in the rotor 12, and can move along the axial direction. The rotor 12 is held by upper and lower bearings 15, 16 in such a way as to rotate freely and at the same time to move along the axial direction only within a predetermined range. At this point, the lower bearing 16 of the rotor 12 is held resiliently in the axial direction by a washer 18 which is interposed between the bearing 16 itself and a boss part (pressing part) 17 that is fitted in the bottom end opening of motor housing 10a of the electrically controlled motor 10. In this regard, the boss part 17 is superposed between the bottom end of motor housing 10a and the top end of valve housing 2, and is fixedly fastened by fastening bolts 19 for fastening the valve housing 2 to the motor housing 10a. Further, a protruding portion 14a for caulking is formed integrally with the bottom end (end portion to which the valve rod 4 is coupled) of motor shaft 14.

In the above description, the motor shaft 14 is coupled to the valve rod 4 by a plate 20 which functions as a shaft coupling and the plate 20 shown in FIG. 1 is depicted in the form of a final shape into which the plate 20 is bent after the plate 20 is fitted to the motor shaft 14. The detailed shape and fitting of the plate 20 and the coupling of the motor shaft to the valve rod 4, will be described in the following description.

FIGS. 2(a) to 2(c) are sectional views to show a shape of the plate for coupling shafts and a process for fitting the plate in FIG. 1 in connection with the motor shaft. FIG. 2(d) is a bottom view of the plate in FIG. 2(a). FIG. 2(e) is a bottom view of the plate in FIG. 2(b). FIG. 2(f) is a bottom view of the plate in FIG. 2(c).

As shown in FIGS. 2(a) and 2(b), the plate 20 is made to be fitted and fixed to the protruding portion 14a of motor shaft 14 while it still has a shape like a flat plate which has portions facing downward which are formed on its both ends to become forming a hooking portion (hooking and engaging portion) 21. And a fitting aperture 22 is made in a center of the plate 20.

Next, procedures to take in fitting the plate 20 which is formed as described above, to the motor shaft 14 while it has a shape like a flat plate, will be described. First, the protruding portion 14a which is formed on the bottom end of motor shaft 14, is fitted into the fitting aperture 22 of plate 20, and then, as shown in FIG. 2(b), the protruding portion 14a is caulked to fix the plate 20 to the bottom end portion of motor shaft 14 while it still has a shape like a flat plate. After the plate 20 is fixed to the bottom end portion, both ends of the plate 20 are bent downward in parallel, as shown in FIG. 2(c). By this process, the plate 20 is bent nearly in the shape of an inversed letter U in cross section and hooking portion 21 which is formed on tips of both end portions (bent portions) 20a, and bent in the shape of an inversed letter U, is made in a form that is separated from and opposed to each other to form a slit 23 (see FIG. 2(c)), into which a bottom side neck portion of the head portion 4a of valve rod 4 can be inserted from a lateral direction, between the opposed tip portions. Hence, when the EGR valve unit shown in FIG. 1 is assembled, in other words, when the valve housing 2 is fitted to the motor housing 10a, if the motor housing 10a is slid laterally on the valve housing 2 to insert the bottom side neck portion of head portion 4a of valve rod 4 into the slit 23 of plate 20, the head portion 4a of valve rod 4 is brought into a state where it can be engaged with the hooking portion 21 of plate 20, whereby the motor shaft 14 is coupled to the valve rod 4.

At this point, the plate 20 is made to be shaped into taper on both sides in a direction of width within a range from near a portion fixed to the motor shaft 14 to the hooking portion 21 before the plate 20 is bent, so that the hooking portion 21 becomes narrower in width (in order for the hooking portion to be shorter in the direction of width of plate 20).

According to Embodiment 1 described above, the output shaft coupling structure is made so that the plate 20 shaped like a flat plate and having the portions to be the hooking portion 21 which are bent in a direction opposite to the motor shaft 14 on both ends, is fixed at its center to the end portion, to which the valve rod 4 is coupled, of the motor shaft 14 by caulking the protruding portion 14a which is formed at the bottom end of motor shaft 14, and after the plate 20 is fixed, the plate 20 is bent at its both ends in order to form the hooking portion 21 to hook and engage with the bottom side of head portion 4a of valve rod 4. Hence, when the plate 20 is fitted and fixed to the motor shaft 14 by caulking, the plate 20 is still held to be shaped in a flat plate, which prevents fitting work space from being limited as is the case with a conventional coupling part which is shaped in hollow cross section. For this reason, Embodiment 1 produces an effect of fitting the motor shaft 14 to the plate 20 quickly within a short time and of improving workability greatly in fitting and fixing the plate 20. Further, since the plate 20 which is shaped like a flat plate, is also readily formable, there is produced an effect of improving productivity and reducing cost. Still further, the plate 20 which has been fixed to the motor shaft 14, can be easily bent in the same direction at its both ends, as described above, to form the slit 23 between the opposed ends of hooking portion 21 by bending. Therefore, there is produced an effect of coupling the motor shaft 14 to the valve rod 4 with ease only by sliding and inserting the bottom neck portion of head portion 4a of the valve rod 4 into the slit 23.

Embodiment 2

FIG. 3(A) is a side view to show a state before a motor shaft being coupled to the valve rod in the output shaft coupling structure of an electrically operated control valve in accordance with Embodiment 2 of the present invention. FIG. 3(B) is an end view when FIG. 3(A) is viewed from right side. Parts which are identical or corresponding to those shown in FIG. 1 and FIG. 2, are denoted by identical reference symbols and further repetitive descriptions for them will be omitted.

In this Embodiment 2, as is the case with Embodiment 1 described above, the plate 20 which is made to be shaped like a flat plate and is fixed to the bottom end of motor shaft 14 by caulking, is bent and formed in such a way that its both side portions 20a, 20a within a range from near a portion fixed to the motor shaft 14 to the hooking portion 21, are formed in the shape of taper which becomes gradually narrowed in width, as shown in FIG. 3(B), and at the same time, in addition, a top surface of the head portion 4a of valve rod 4 is made to have a curved portion 4b.

According to Embodiment 2 constructed with the above described arrangement, both side portions 20a, 20a which are formed by bending both ends of the plate 20, that is shaped like a flat plate and is fixed to the bottom end of motor shaft 14, after the plate 20 is fixed, are formed in the shape of taper, as described on Embodiment 1 above, thereby being narrowed in width gradually with getting nearer to the hooking portion 21, and the top surface of the head portion 4a of valve rod 4 is made to have a curved portion 4b. Hence, there is produced an effect that when the head portion 4a of valve rod 4 is slid and fitted between both side portions 20a of the plate 20 so as to couple the motor shaft 14 to the valve rod 4, even if the head portion 4a is put into contact with the plate 20, the head portion 4a can be easily slid and introduced between both side portions 20a of the plate 20 by the curved portion 4b of head portion 4a. Further, since both side portions 20a of the plate 20 are formed in a shape of taper, respectively, the head portion 4a which is inserted between both side portions 20a, can be easily introduced along an inner wall surface of taper shaped both side portions 20a to a regular engagement position with respect to the hooking portion 21. This can produce an effect of improving workability in coupling the motor shaft 14 to the valve rod 4.

Embodiment 3

Figure 3:
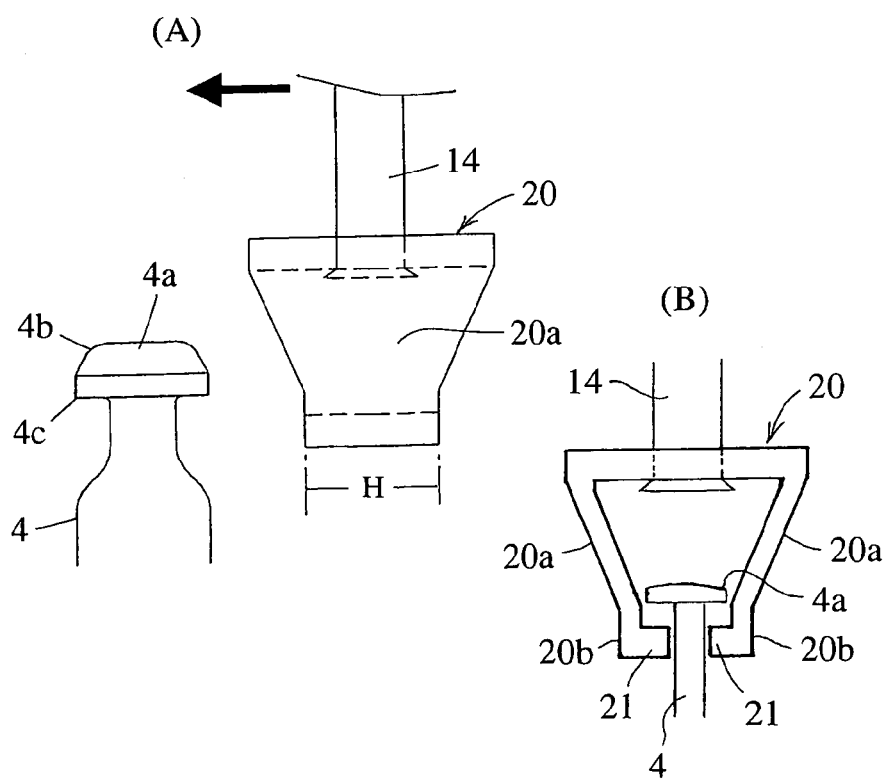
FIG. 3(A) is a side view to show a state before a motor shaft being coupled to a valve rod in the output shaft coupling structure of an electrically operated control valve in accordance with Embodiment 2 of the present invention.
FIG. 3(B) is an end view when

This Embodiment 3 will be described also by use of FIG. 3. In this Embodiment 3, vertical surface portions 20b are formed respectively near bottom ends (hooking portion 21) of both side portions 20a of the plate 20 in addition to the coupling structure of Embodiment 2 described above, and at the same time, a bent interior angle which is formed by this vertical surface portion 20b and the hooking portion 21 is made substantially right angle, and a bottom outside corner portion of the head portion 4a of valve rod 4 is shaped into an edge portion 4c having substantially right angle. Further, the hooking portion 21 is so formed as to have a minimum width H which enables the hooking portion 21 hook the head portion 4a.

According to Embodiment 3 constructed with the above described arrangement, the edge portion 4c at bottom end of the head portion 4a of valve rod 4 and an inside corner portion, which is formed by the vertical surface portion 20b on the bottom end of plate 20 and the hooking portion 21, and which has substantially right angle, can secure larger hooking area where the hooking portion 21 hooks the head portion 4a when the valve rod 4 is pulled up. For this reason, the coupling structure of Embodiment 3 produces an effect of preventing the hooking portion 21 from being bent or broken by fatigue owing to a pulling load of the valve rod 4 and hence it improves reliability in strength. Further, since the hooking portion 21 is formed in the minimum width H that enables the hooking portion to hook the head portion 4a, the coupling structure of Embodiment 3 produces an effect of shortening time required to fit the head portion 4a to the hooking portion 21 by sliding the plate 20 over the valve rod 4 and of improving workability in fitting them.

Embodiment 4

Figure 4:
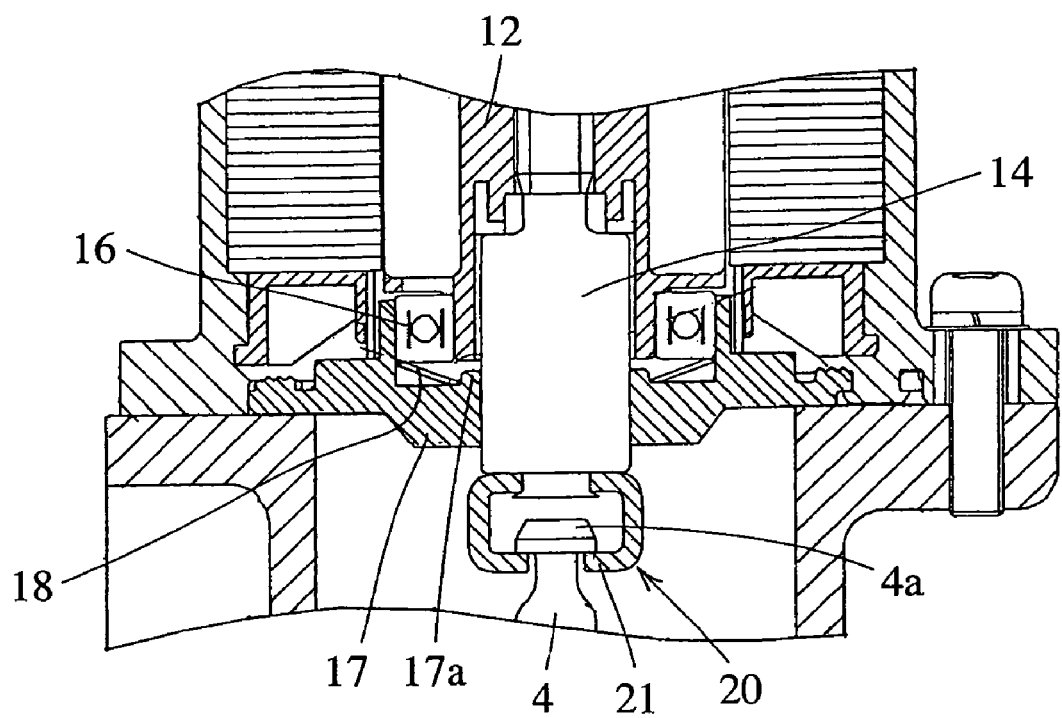
FIG. 4 is a sectional view to show the relevant portion of an EGR valve unit in accordance with Embodiment 4 of the present invention.

FIG. 4 is a sectional view to show the relevant portion of an EGR valve unit in accordance with Embodiment 4 of the present invention. The same parts as in FIG. 1 are denoted by the same reference symbols and further repetitive descriptions for them will be omitted.

In this Embodiment 4, in order to regulate an amount of deformation of the washer 18 for holding the rotor 12 resiliently in the axial direction via its lower bearing 16, a deformation regulating portion 17a of washer 18 is formed integrally with a boss part (pressing part) 17 for pressing the washer 18. The deformation regulating portion 17a is constructed of an annular wall portion which is integrally formed with the boss part 17 in such a way that the motor shaft 14 is brought into sliding contact with the annular wall portion in the axial direction.

According to Embodiment 4 constructed with the above described arrangement, the washer 18 is deformed by the pulling-down load which is applied to the motor shaft 14 when the valve rod 4 is pulled up, but the amount of deformation of the washer 18 is regulated by the deformation regulating portion 17a of boss part 17. Hence, Embodiment 4 produces an effect of preventing the washer 18 from causing fatigue fracture at an early stage of using owing to repeated deformation and hence of improving its durability.

Embodiment 5

Figure 5:
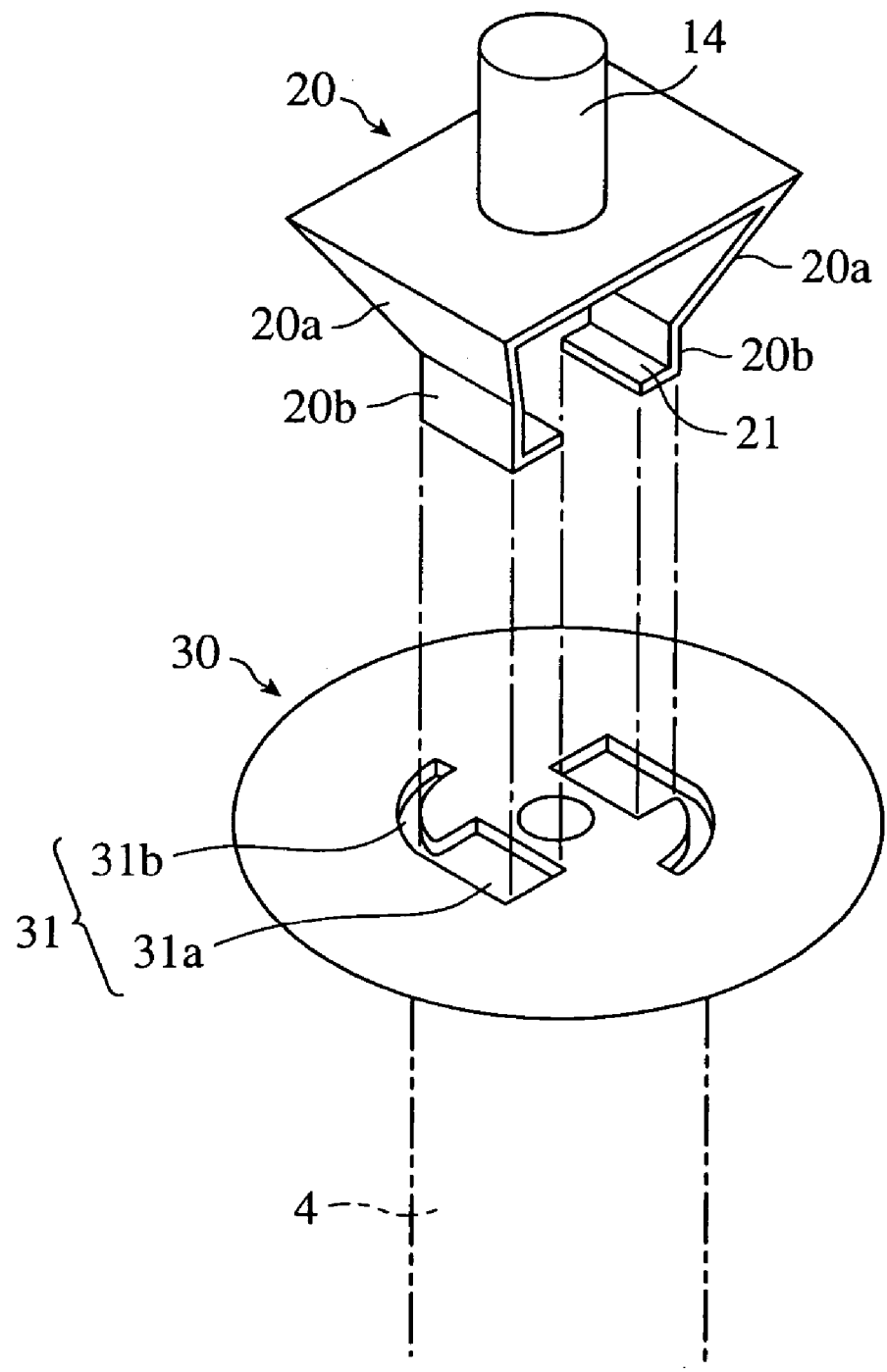
FIG. 5 is an exploded perspective view to show the relevant portion of an output shaft coupling structure of the electrically operated control valve in accordance with Embodiment 5 of the present invention.

FIG. 5 is an exploded perspective view to show the relevant portion of an output shaft coupling structure of the electrically operated control valve in accordance with Embodiment 5 of the present invention. Parts which are identical or corresponding to those shown in FIG. 1 and FIG. 2, are denoted by identical reference symbols and further repetitive descriptions for them will be omitted.

In Embodiment 5, in place of the head portion 4a of valve rod 4 in respective embodiments described above, a disk shaped engaging part (engaging part) 30 with which the plate 20 is engaged, is fixed to the top end of valve rod 4 and engaging apertures 31, which the hooking portion 21 of plate 20 are fitted in and engaged with, respectively, are made in the engaging part 30. Each of these engaging apertures 31 is made of a wide inserting aperture (inserting inlet) 31a into which the hooking portion 21 can be inserted and a narrow engaging aperture 31b which is formed continuously with the wide inserting aperture 31a and in a shape of circular arc having its center at a center of the axis of valve rod 4.

According to Embodiment 5 constructed with the above described arrangement, by inserting the hooking portion 21 of the plate 20 into the wide inserting aperture 31a of engaging part 30 which is fitted to the top end of valve rod 4 and by turning the motor shaft 14 or the valve rod 4 in one direction, the hooking portion 21 can be engaged with the narrow engaging aperture 31b in engaging aperture 31. Hence, as is the case with Embodiment 1, the coupling structure of Embodiment 5 produces an effect of coupling the motor shaft 14 to the valve rod 4 quickly within a short period of time and of improving workability in the coupling them.

At this point, in each Embodiment, a stepping motor or a DC motor can be used as the electrically controlled motor.

What is claimed is:

1. Output shaft coupling structure of electrically operated control valve including:
    a valve rod which is provided with valve for opening and closing fluid passage and is mounted to valve housing in such a way as to move along an axial direction; and
    an electrically controlled motor for driving the valve rod along the axial direction,
    and the coupling structure couples motor shaft of the electrically controlled motor to the valve rod, wherein a plate shaped like a flat plate is fixed at its center to end portion, to which the valve rod is coupled, of the motor shaft and both ends of the plate is bent downward in parallel substantially in an inversed U shaped in cross section to form hooking and engaging portion at its both ends, wherein tips of both end portions of the inversed U shaped plate oppose each other inwardly towards a head portion of the valve rod to form a slit into which the head portion of the valve rod is inserted from a lateral direction between the opposed tip portions.

2. The output shaft coupling structure of electrically operated control valve as claimed in claim 1, wherein the hooking portion, which hooks and engages with the valve rod, of the plate, is formed in a minimum width which is long enough to hook the valve rod.

3. The output shaft coupling structure of electrically operated control valve as claimed in claim 1, wherein the end portion, to which the motor shaft is coupled, of the valve rod has engaging part which is fixed thereto, and the engaging part has engaging aperture to engage with and to fix the hooking and engaging portion by inserting and turning the hooking and engaging portion.

4. The output shaft coupling structure of electrically operated control valve as claimed in claim 1, wherein the electrically controlled motor is provided with pressing part for pressing washer for holding rotor resiliently in axial direction, and the pressing part is provided with deformation regulating part for regulating amount of deformation of the washer.

5. The output shaft coupling structure of electrically operated control valve as claimed in claim 1, wherein the head portion is formed in curved surface at its tip portion and surface at which the head portion is hooked by the plate, is formed in edge portion.

6. The output shaft coupling structure of electrically operated control valve as claimed in claim 1, further comprising a spring interposed between a spring holder fitted integrally on the valve rod and a bottom wall of outside depressed portion of the valve housing.

7. The output shaft coupling structure of electrically operated control valve as claimed in claim 1, wherein bent portions of both sides of the plate are shaped into taper that becomes narrower in width toward portion at which it hooks and engages with the valve rod.

8. The output shaft coupling structure of electrically operated control valve as claimed in claim 1, wherein the slit is configured to fit a bottom side neck portion of the head portion of the valve rod in a lateral direction between the opposed tip portions.

9. The output shaft coupling structure of electrically operated control valve as claimed in claim 1, further comprising an edge portion at bottom end of the head portion of the valve rod and an inside corner portion formed by vertical surface portions on bottom end of the plate and the hooking and engaging portion.

10. The output shaft coupling structure of electrically operated control valve as claimed in claim 1, further comprising a disk shaped engaging portion which includes a wide receiving aperture configured to receive the hooking and engaging portion and a narrow circular arc shaped engaging aperture formed continuously with the wide receiving aperture.

11. The output shaft coupling structure of electrically operated control valve as claimed in claim 10 wherein the circular arc shaped engaging aperture having its center at a center of the axis of the valve rod.

* * * * *